United States Patent [19]
Gibson, Jr. et al.

[11] 3,941,027
[45] Mar. 2, 1976

[54] FASTENER SYSTEM FOR STRUCTURAL MEMBERS

[75] Inventors: Harry S. Gibson, Jr.; Stephen C. Rogers, Jr., both of Atlanta, Ga.

[73] Assignee: Lockheed Aircraft Corporation, Burbank, Calif.

[22] Filed: May 8, 1975

[21] Appl. No.: 575,987

[52] U.S. Cl. ............... 85/1 R; 85/77; 52/758 F; 403/408
[51] Int. Cl.² ........................... F16B 5/00
[58] Field of Search ............ 85/1 R, 7, 77, 78, 1 P; 151/41.74; 52/758 F; 403/388, 408

[56] References Cited
UNITED STATES PATENTS

| | | | |
|---|---|---|---|
| 3,078,002 | 2/1963 | Rodgers | 52/758 F |
| 3,271,058 | 9/1966 | Anderson | 151/41.74 |
| 3,322,449 | 5/1967 | Becker | 52/758 F |
| 3,603,626 | 9/1971 | Whiteside | 52/758 F |
| 3,641,865 | 2/1972 | Swindt et al. | 85/7 |
| 3,682,508 | 8/1972 | Briles | 52/758 F |
| 3,835,615 | 9/1974 | King | 85/77 |

FOREIGN PATENTS OR APPLICATIONS

| | | | |
|---|---|---|---|
| 413,410 | 7/1934 | United Kingdom | 85/1 P |

Primary Examiner—Marion Parsons, Jr.
Attorney, Agent, or Firm—Billy G. Corber; John J. Sullivan

[57] ABSTRACT

An improved fastener system is derived for cold working the surfaces defining aligned fastener holes in structural members and installing fasteners therein. Essentially, an integral fastener and mandrel construction facilitates the insertion of a sleeve into the holes, an expansion of the sleeve thus disposed to thereby cold work the surfaces of the members defining the holes, and the pulling of the fastener into the holes thus prepared and sleeve-lined. A frangible neck is provided between the fastener element and the mandrel element which permits the breaking off and discarding of the latter after the former is installed. Retenion means is then installed, formed or otherwise provided on the fastener end in conventional manner. Thus, cold working and fastener installation is accomplished in only two steps due to the critical design and configuration of the combined fastener, break-off groove and mandrel.

6 Claims, 6 Drawing Figures

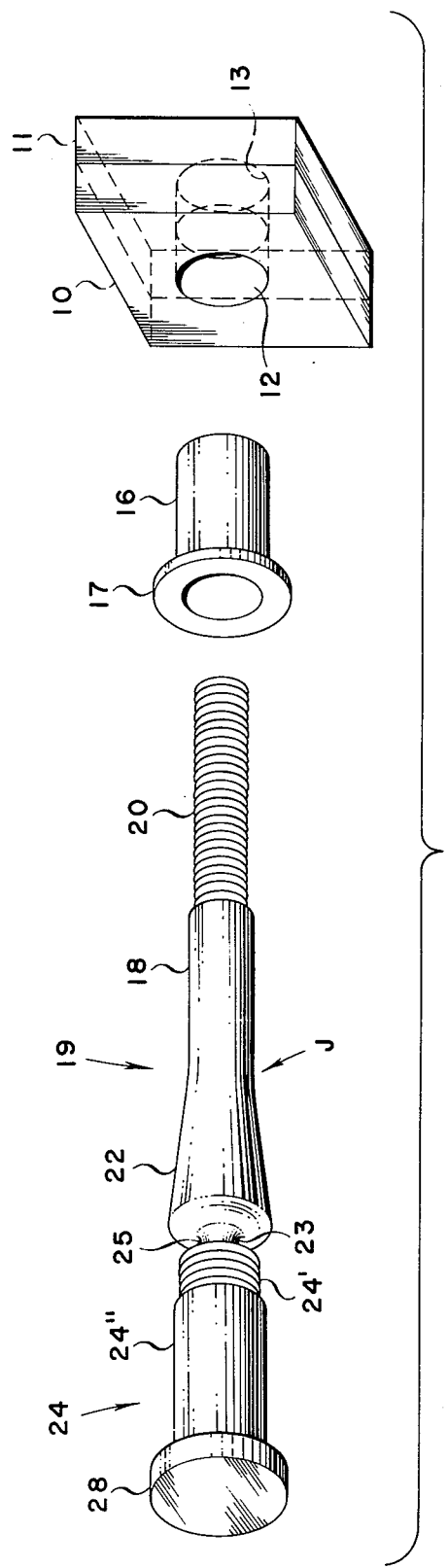
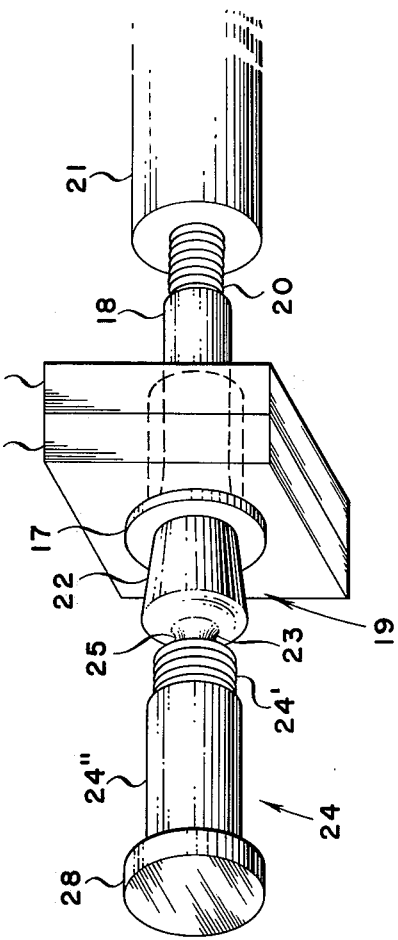
Fig. 1
Fig. 2

FASTENER SYSTEM FOR STRUCTURAL MEMBERS

This invention relates generally to fastener systems and more particularly to the type of fastener system required to join structural members such as are employed in aircraft.

The dynamic loads imposed on structural members of aircraft tend to concentrate at the joints where they are transferred into and through the fasteners. Much effort has, therefore, been expended over the years not just in the design and construction of fasteners perse but also in the matching of the fasteners to the members to be joined thereby. Such fastener systems all recognize the importance of an immovable connection to produce, in effect, an integral structural assembly. Illustrative of this are the prior art concepts of the following United States patents which propose various ways of positively assuring that the aligned holes in the joined members are filled:

U.S. Pat. No. 2,061,629 issued Nov. 24, 1936 to L. C. Huck
U.S. Pat. No. 2,531,048 issued Nov. 21, 1950 to L. C. Huck
U.S. Pat. No. 2,531,049 issued Nov. 21, 1950 to L. C. Huck
U.S. Pat. No. 2,754,703 issued July 17, 1956 to L. C. Huck
U.S. Pat. No. 2,974,558 issued Mar. 14, 1961 to F. G. Hodell
U.S. Pat. No. 3,292,482 issued Dec. 20, 1966 to B. A. G. Fry et al
U.S. Pat. No. 3,412,639 issued Nov. 26, 1968 to B. S. Sauter
U.S. Pat. No. 3,693,247 issued Sept. 26, 1972 to C. K. Brown Several prior art concepts propose an improved connection of the structural members through an interference fit whereby the fastener is designed to virtually expand the aligned holes. Illustrations of such means to carry out this concept are disclosed in the following patents:

U.S. Pat. No. 3,578,367 issued May 11, 1971 to L. A. Harvill et al
U.S. Pat. No. 3,820,297 issued June 28, 1974 to R. L. Hurd In the process of accomplishing the same results, i.e., producing a structurally stronger connection of joined members, it has been recognized that the sizing of the aligned holes is extremely important. This assures that the loads being transferred through the members and across the fastener are uniformly applied to the entire fastener and not concentrated on localized areas thereof so as to act in an eccentric manner. The patent to La Bombard et al. U.S. Pat. No. 2,972,274 dated Feb. 21, 1961, for example, includes a series of cutting edges on the end of the fastener to shave the surfaces of the aligned holes in the members to be joined. The concentricity of the holes is thereby said to be assured and a perfect match of the fastener shank therewith is effected.

The King U.S. Pat. No. 3,835,688 dated Sept. 17, 1974 obtains accurate sizing of the aligned holes through the use of an intermediate sleeve. Thus, by tailoring the material of a seamless sleeve of selected properties relative to the material of the members to be joined, this sleeve when inserted in the aligned holes can be expanded uniformly to thereby define an accurate passage for the fastener shank when installed.

The present invention proposes to build upon the foregoing state of the art by extending the teachings thereof. To this end this invention appreciates the advantages of the King sleeve and further contemplates the additional use of such a sleeve for the purpose of cold working the material of the members defining the aligned holes. By "cold working" is meant the setting up of compressive stresses in the material adjacent the surfaces of the hole which are in excess of the plastic deformation zone. This is distinguished from heretofore practiced interference fit which sets up and secures such stresses which are below the plastic deformation zone. Thus, in contrast to cold working, an interference fit stresses the material only so long as the fastener is in place; when the fastener is removed, these stresses are relieved and the material approaches its original condition.

While cold working perse of metal parts, including structural members in the area thereof adjacent fastener openings, is not new, it has not been heretofore accomplished with any degree of success. Using prior techniques, the cold worked part produces a fastener hole of irregular, i.e., non-constant diameter and not uniformly and totally cold worked, requiring subsequent reaming in order to produce a true, cylindrical and accurate passage for proper interface with the fastener shank when installed. Through the use of a sleeve, as herein contemplated, the relatively large expansion of the holes necessary to produce cold working can be accurately accomplished in one operation and without damage to the material of the members adjacent the holes. Moreover, the metal of the structural members defining the holes when cold worked using the sleeve as herein proposed retains compressive stresses of a high magnitude at each hole surface and continuing radially outward from the hole in all directions while in the non-fastener supported state. The magnitude of these radial, compressive stresses decreases relatively slowly as the distance from the hole increases. These residual stresses are significant at more than a diameter distance from the associated hole and have been shown to contribute substantially to fatigue enhancement of mechanically fastened, structural joints.

At the same time cold working the metal of the structural members as herein proposed is in sharp contrast to the other prior art teachings as typified by the above-cited patents. These various broaching and hole filling techniques known to the art either smooth the surface of the hole, fill the hole or lap the surface. Those which permanently stress the metal of the structural members adjacent the aligned holes require subsequent operations and even then do not produce a hole defining surface that is uniformly and totally cold worked. This latter condition is most desirable in the more demanding applications, such as in aircraft, and is attainable for the first time through practice of the teaching herein.

In essence the present invention has in view as a unitary assembly a fastener element terminating at its tail end in a mandrel element separated therefrom by a breakoff neck. The mandrel element in turn is formed by a tapered inner portion and a constant diameter portion extending therefrom. The fastener element is limited only to the extent that it must be properly dimensioned to match the ultimate dimensions of the passage therefor in the structural members to be joined.

The constant diameter portion of the mandrel element is sized to correspond to the original internal diameter of the sleeve. The length of the constant diameter portion is at least equal to that of the sleeve and does not include a connecting length between the constant diameter and tapered portions of the mandrel element. This connecting length serves to provide a smooth transition between these mandrel portions.

The maximum diameter of the tapered portion is controlled by the amount of sleeve expansion required in order to accomplish the desired cold work and permanent stress set in the structural members. The length of the tapered portion of the mandrel element is such as not to cause tensile failure of the sleeve. This has been determined to be not less than the original sleeve length.

It is also essential to effect a balanced combination with respect to size and strength of the mandrel element, the break-off neck and the fastener element. The mandrel element is of such a strength and shape as to accommodate the sleeve on the constant diameter thereof, to apply sufficient radial force on the sleeve and structural members to cold work the surfaces thereof defining the holes, to move the fastener element into the hole with the desired fit, and to break off the mandrel from the fastener element without damage to the fastener, the hole defining surface or the sleeve.

With the above and other objects in view as will become apparent, this invention consists in the construction, arrangement and combination of parts all as hereinafter more clearly described, claimed and illustrated in the accompanying drawings, wherein:

FIG. 1 is an isometric view of the components which comprise an assembly formed by an integral fastener element and mandrel element and a separate sleeve all designed and constructed in accordance with the teachings of the present invention illustrated in exploded position adjacent a pair of structural members to be interconnected thereby when installed in aligned holes in the members;

FIG. 2 is a similar view showing the constant diameter portion of the mandrel element inside the sleeve and the sleeve located within and passing through the aligned holes in the structural members, a force applying tool being shown connected to the tail end of the mandrel element to facilitate insertion of the sleeve and mandrel in the members;

Figure 3:
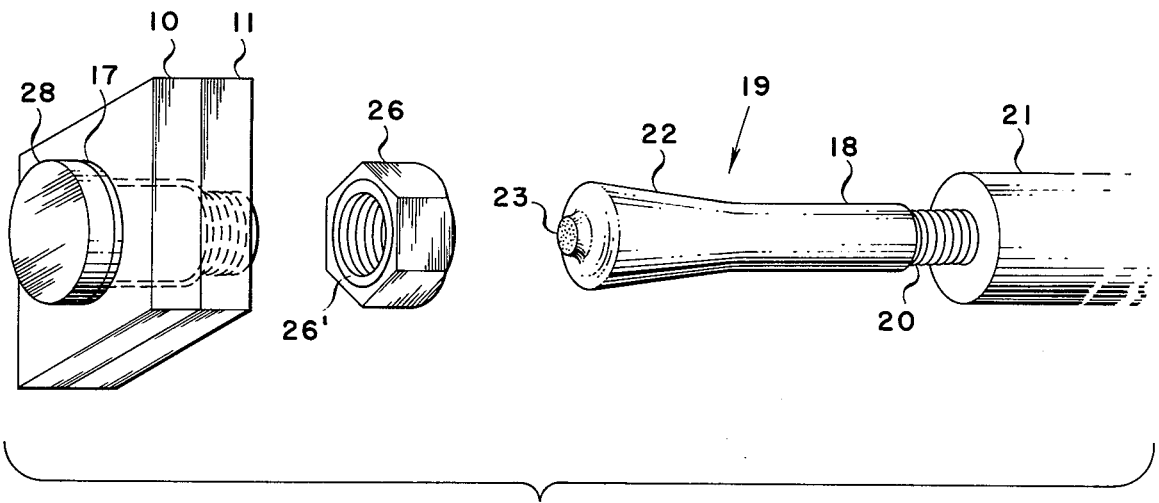
FIG. 3 is a similar view showing the fastener element installed in the holes in the structural member, the mandrel element having been broken off; and retention means in the form of a nut adapted to be threaded on to the tail end of the fastener element.

Referring more particularly to the drawings, 10 and 11 designate a pair of structural members each pierced with substantially identical openings 12 and 13 respectively adapted to be aligned one with the other and through which the members 10 and 11 are to be interconnected. One end of the opening 12 may be countersunk, as at 14, (FIGS. 5 and 6) if desired, to receive and seat therein a complementary head 15 formed on one end of a tubular member or sleeve 16 adapted to be inserted therein. Alternatively, this end of the sleeve 16 may terminate in a flange 17, (FIGS. 1 through 3) adapted to abut the face of the member 10 when the sleeve 16 is located in the openings 12 and 13. In this case the end of the opening 12 associated with the flange 17 is not countersunk.

In either case, the sleeve 16 although not necessarily is preferably seamless and sized in length Y and external diameter Z to match the corresponding dimensions L and Z of the openings 12 and 13. Thus, little or no force is required in order to fully insert the sleeve 16 in the aligned openings 12 and 13. For purposes to become more apparent length Y is at least equal to length L, and is preferably greater than length L by but not greater than 20% of the ultimate diameter of the holes 12 and 13.

Internally the sleeve 16 is sized to a diameter X which is substantially the same as a constant diameter portion 18 of a mandrel element 19 which is insertable in the sleeve 16 whereby to facilitate the installation of the sleeve 16 in the openings 12 and 13 as described. The length of the portion 18 of mandrel element 19 is preferably about equal to the length Y of the sleeve 16 although it may be as short as the length L.

The head or leading end of the constant diameter portion 18 of the mandrel 19 may terminate in a stem 20 of smaller transverse dimension than diameter X which facilitates its insertion into the sleeve 16 and is long enough to permit the application of a pulling force necessary to expand the sleeve 16 and thereby cold work the adjacent surfaces of the members 10 and 11. For this purpose the stem 20 is provided with gripping elements such as threads 20' adapted to be engaged by a tool 21, for example. This tool 21 facilitates the mounting of the sleeve 16 on the constant diameter portion 18 of the mandrel 19 as well as the installation of the sleeve 16 in the aligned openings 12 and 13.

At its other end the constant diameter portion 18 of the mandrel 19 extends into an outwardly tapered portion 22 having a maximum diameter A which is substantially equal to the diameter X plus from about 3.5% to 6.5% of diameter X. A junction J is provided between portions 18 and 22 of the mandrel 19 being formed by an intermediate portion or interconnection having a radius large enough to permit a smooth transition of the surfaces of these portions 18 and 22. The length of the tapered portion 22 is about equal to the length Y of the sleeve 16 in order to properly apply the radial and axial force on the sleeve 16.

The outer end of the tapered portion 22 is integrally connected as at 23 to, so as to extend in axial alignment from, the extremity of a fastener element 24. The thickness of this connection 23 is substantially less than that of the adjacent ends of the fastener 24 and the mandrel 19 to thereby produce a neck 25 between these elements and constitute a frangible connection.

The fastener 24 may be of any conventional design but for present purposes is illustrated and described as a bolt terminating in a threaded end 24' adapted to receive a nut 26 which acts in opposition to a head, which may be either countersunk i.e. flush as at 27 or otherwise i.e. non-flush as at 28, in the ultimate connection of the members 10 and 11. The inner surface of the nut 26 may be counterbored as at 26' to accommodate the end of the sleeve 16 which as above stated is preferably slightly longer than the length L and protrudes beyond the adjacent surface of the member 11 to assure cold working of the entire surface of the openings 12 and 13. The critical aspects of this fastener or bolt 24 is that it has a constant diameter shank 24" of a length approximately equal to length L of the members 10 and 11 and corresponding in configuration to that established by the aligned openings 12 and 13. In addition, the fastener 24 is provided with a tail end adapted to form or receive a retainer element to act in opposition to its head.

Also, the diameter S of the fastener 24 is critical to the extent that it is predetermined to fit snugly in the sleeve 16 in the ultimate assembly of the members 10 and 11. To this end the diameter S is made to be equal to the internal diameter X of the sleeve 16 plus approximately from 2 to 5% of diameter X depending upon the amount of cold work to be produced on the surfaces of the surfaces of the holes 12 and 13. If an interference fit is desired an additional length should be added to the shank diameter applying the usual practice to establish the amount of interference to be effected.

Figure 6:
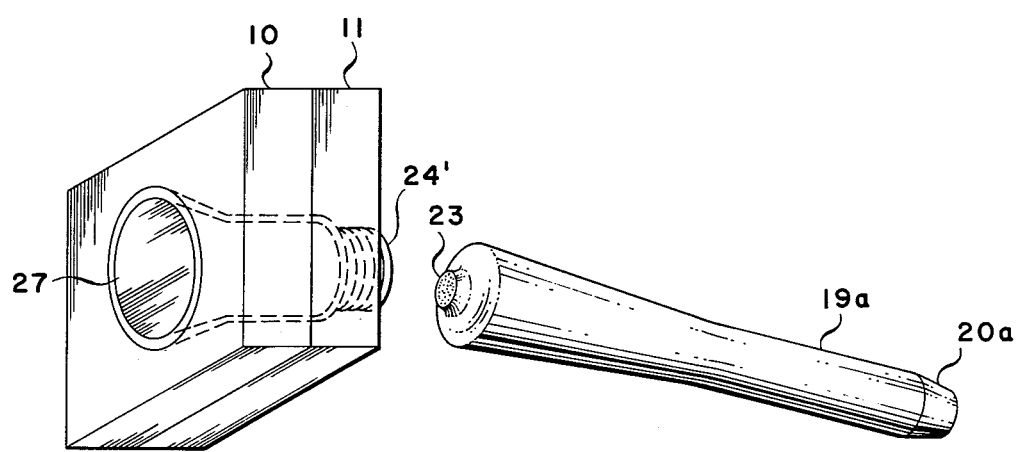
FIG. 6 is a view similar to FIG. 3 showing the ultimate connection of the structural members after installation of the components of FIG. 5.
Figure 4:
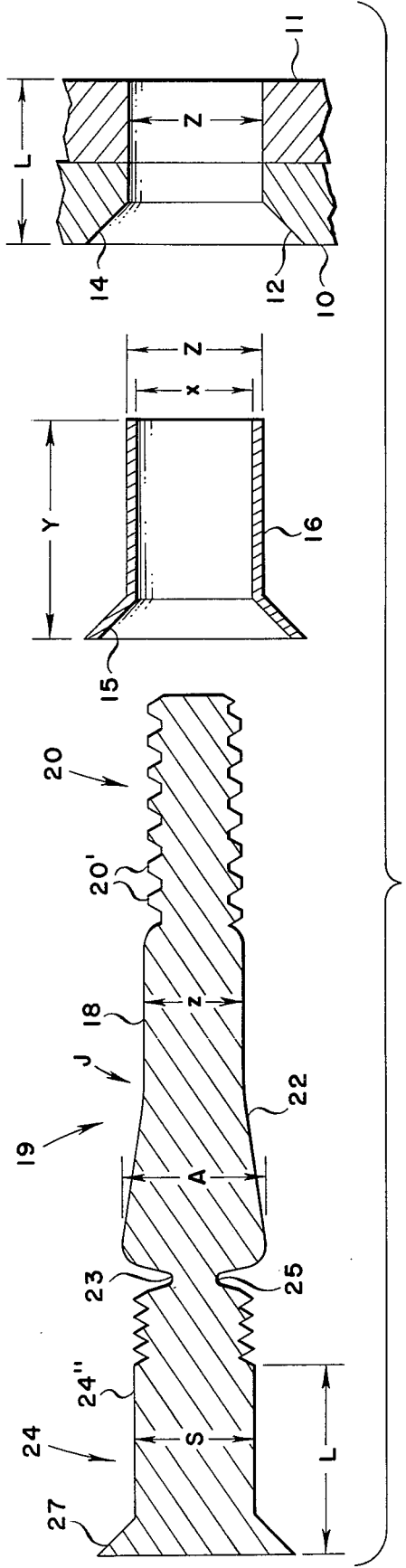
FIG. 4 is a longitudinal section taken through the assembly and structural members disposed in the position shown in FIG. 1 with the critical, relative dimensions thereof indicated.
Figure 5:
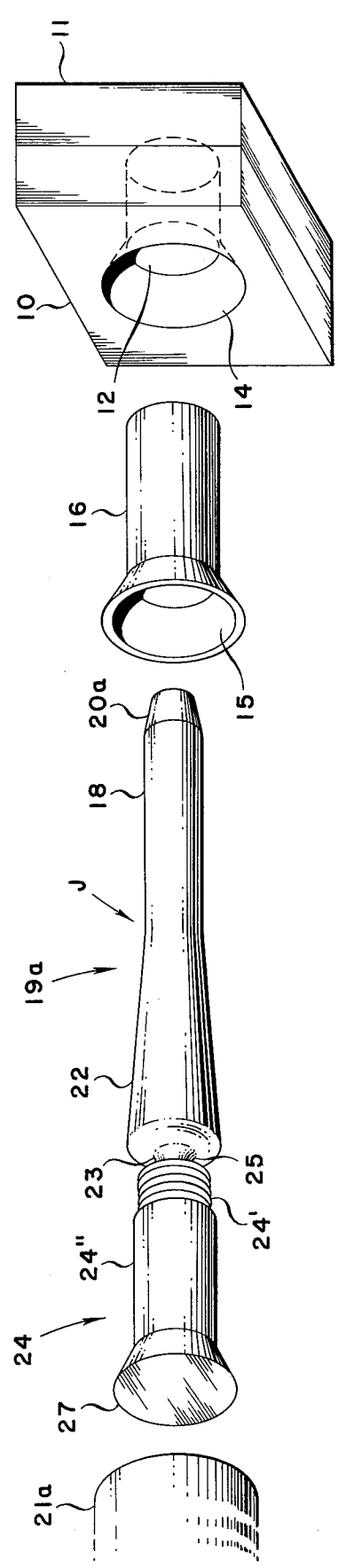
FIG. 5 is a view similar to FIG. 1 of slightly modified components of the assembly herein contemplated.

Referring more particularly to FIGS. 5 and 6, a slightly different mandrel 19a is illustrated which in contrast to the stem 20, as described, terminates in a foreshortened, tapered stem 20a. In this form of the invention the mandrel 19a, sleeve 16 and fastener 24 assembly is adapted to be pushed, for example, by a tool 21a as shown in FIG. 6 instead of drawn or pulled into the ultimate position in the structural members 10 and 11. In all other respects the parts of the assembly shown in FIGS. 5 and 6 and the method of installation is the same as that for the assembly shown in FIGS. 1 through 4.

In view of the foregoing design and construction of the several parts, the operation involved in making the connection of the structural members 10 and 11 will now be described. The stem 20 or 20a is inserted into the sleeve 16 which is located around the constant diameter portion 18 of the mandrel 19. The stem 20 or 20a is then placed into the aligned openings 12 and 13 in members 10 and 11. The tool 21 is attached onto the stem 20, or in the case of stem 20a the tool 21a is placed against the fastener head 27 or 28 as the case may be of the fastener element 24, and a force is applied thereto which initially moves the sleeve 16 completely into the openings 12 and 13 until the sleeve head 15 or 17 as the case may be abuts the adjacent surface of the member 10. At this time the end of the sleeve 16 is at least flush with the outer surface of the member 11 and preferably extends beyond such surface. In no case, however, may this extension of the sleeve 16 beyond the member 11 exceed the point where it interferes with the particular retainer, such as the nut 26, to be employed on the end of the fastener 24. Thereafter, the force applied by the tool 21 or 21a moves the tapered portion 22 of the mandrel 19 through the sleeve 16 radially expanding it and the surfaces defining the openings 12 and 13.

Finally, the continued application of force by the tool 21 or 21a moves the fastener 24 into the sleeve 16 until the fastener head 27 or 28 abuts the respective sleeve head 15 or 17. At this time the threaded tail end 24' of the fastener 24 extends beyond the surface of the member 11 and is separated from the mandrel 19 by breaking the connection 23. The nut 26 is then tightened on the threaded end of the fastener 24 to retain the assembly of the members 10 or 11 by the clamping action of the fastener head 27 or 28 and nut 26 in the conventional way.

What is claimed is:

1. A fastener system adapted to secure abutting, structural members having aligned openings of substantially equal diameter passing therethrough comprising in combination:

a sleeve having an external diameter substantially equal to the diameter of said aligned structural member openings and a length not less than the aggregate length of said aligned openings of said abutting structural members; and a fastener element and mandrel element integrally connected end to end in coaxial alignment by a neck of substantially less thickness to thereby constitute a frangible connection, said mandrel element being formed by a constant diameter portion at the end thereof remote from said neck which conforms in diameter and shape to the interior of said sleeve and is at least as long as said aligned openings of said abutting structural members whereby said sleeve is adapted to be disposed on and around said constant diameter portion with substantially no applied force and a tapered diameter portion between said neck and said constant diameter portion with the maximum transverse dimention thereof located adjacent said neck and equal to the interior sleeve diameter plus about 3.5 percent to 6.5 percent of said interior sleeve diameter, and said fastener element being formed by a shank having a length approximately equal to that of said aligned and contiguous structural member openings and a diameter substantially equal to that of said sleeve interior plus about from 2 percent to 5 percent of said sleeve interior diameter, a head on the end of said shank remote from said neck shaped and sized to conform with and abut the opening defining surface in the adjacent structural member and a tail end adjacent said neck including a retainer element adapted to act in opposition to said head.

2. The fastener system of claim 1 wherein said sleeve has a length up to about 20% greater than the diameter of said fastener shank.

3. The fastener system of claim 2 wherein said retainer element is a threaded extension adapted to receive a nut, the inner surface of said nut being counterbored to receive and accommodate the end of said sleeve extending beyond said abutting structural members.

4. The fastener system of claim 1 wherein the length of said tapered diameter portion is about equal to the length of said sleeve and including an interconnection between said constant diameter portion and said tapered diameter portion having a radius large enough to permit a smooth transition of the surfaces of said constant diameter and said tapered diameter portions.

5. The fastener system of claim 1 wherein said constant diameter portion of said mandrel element terminates in a stem of smaller transverse dimension than said constant diameter portion and facilitates its insertion into said sleeve.

6. The fastener of claim 5 wherein said stem includes gripping elements adapted for engagement by a force applying tool.

* * * * *